(12) United States Patent
Garg et al.

(10) Patent No.: US 11,523,404 B2
(45) Date of Patent: Dec. 6, 2022

(54) RADIO LINK PRIORITIZATION

(71) Applicant: QUALCOMM Incorporated, San Diego, CA (US)

(72) Inventors: Vinay Garg, San Diego, CA (US); Ajay Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/157,026

(22) Filed: Jan. 25, 2021

(65) Prior Publication Data

US 2022/0240263 A1    Jul. 28, 2022

(51) Int. Cl.
| | |
|---|---|
| *H04W 4/00* | (2018.01) |
| *H04W 72/10* | (2009.01) |
| *H04W 72/04* | (2009.01) |
| *H04B 17/318* | (2015.01) |
| *H04W 48/18* | (2009.01) |
| *H04W 72/12* | (2009.01) |
| *G06N 20/00* | (2019.01) |

(52) U.S. Cl.
CPC .......... *H04W 72/10* (2013.01); *H04B 17/318* (2015.01); *H04W 48/18* (2013.01); *H04W 72/0453* (2013.01); *H04W 72/1242* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,039,016 B1 | 7/2018 | Larish et al. | |
| 11,206,237 B1* | 12/2021 | Yan | G06Q 30/016 |
| 2015/0254252 A1* | 9/2015 | Khalil | G06F 16/951 |
| | | | 707/706 |
| 2019/0213504 A1 | 7/2019 | Vasseur et al. | |
| 2019/0274108 A1* | 9/2019 | O'Shea | G06N 3/0445 |
| 2020/0022054 A1 | 1/2020 | Hong et al. | |
| 2020/0259545 A1 | 8/2020 | Bai et al. | |
| 2021/0342211 A1* | 11/2021 | Melo | G06F 11/079 |
| 2022/0094390 A1* | 3/2022 | Dennis | H04L 1/20 |
| 2022/0250506 A1* | 8/2022 | Goldman-Shenhar | |
| | | | B60L 58/26 |
| 2022/0253874 A1* | 8/2022 | Smith | G06Q 10/10 |

FOREIGN PATENT DOCUMENTS

WO    2020080989 A1    4/2020

* cited by examiner

*Primary Examiner* — Bob A Phunkulh
(74) *Attorney, Agent, or Firm* — The Marbury Law Group, PLLC

(57) ABSTRACT

A communication network element may send to a plurality of wireless devices a base radio link priority model that provides as an output a first prioritization of radio links. The wireless devices may generate trained radio link priority models using machine learning based on one or more attempts to establish a communication link with the communication network. The communication network element may receive trained radio link priority models from one or more wireless devices, update the base radio link priority model, and send to the wireless devices an updated base radio link priority model that provides as an output a second prioritization of radio links.

24 Claims, 12 Drawing Sheets

RADIO LINK PRIORITIZATION

BACKGROUND

Most wireless devices are capable of communicating with a base station using more than one radio access technology (RAT), and within each RAT using one of a number of frequency bands. When a wireless device attempts to establish or re-establish a communication link with a base station, the wireless device may use an on-device priority list to select which RAT, which frequency band, and/or which frequency to try first, second, third, etc.

Various conditions may cause a wireless device to have difficulty or even fail in performing cell acquisition or recovery of a dropped radio link (e.g., Radio Link Failure) with a base station in a wireless communication network. Such conditions may include local radio frequency conditions, network congestion, network outages, and the like. In a given area, or for a base station or group of base stations, such conditions will likely affect numerous wireless devices. Each of the wireless devices will work through its priority list of RATs, frequency bands, and/or frequencies, and each wireless device will experience the same difficulties with establishing communication or recovering a failed radio link with a base station. In so doing, each wireless device experiences delay in establishing network communication and unnecessary battery power consumption.

SUMMARY

Various aspects include systems and methods performed by communication network elements for radio link prioritization. Various aspects may include sending to a plurality of wireless devices a base radio link priority model that provides as an output a first prioritization of radio links, receiving from one or more of the plurality of wireless devices a trained radio link priority model generated by using machine learning to update base radio link priority model based on attempts to establish a communication link with a communication network, updating the base radio link priority model using trained radio link priority models received from one or more of the plurality of wireless devices, and sending to the plurality of wireless devices an updated base radio link priority models that provides as an output a second prioritization of radio links.

In some aspects, outputs of the first prioritization of radio links and the second prioritization of radio links may each include a prioritization of radio access technologies (RATs), frequency bands, or frequencies for use by the plurality of wireless devices in establishing the communication link with the communication network. In some aspects, receiving from one or more of the plurality of wireless devices a trained radio link priority model may include receiving from one or more of the plurality of wireless devices weighting values from each trained radio link priority model. In some aspects, updating the base radio link priority model using radio link priority models received from one or more of the plurality of wireless devices may include aggregating trained radio link priority models received from two or more of the plurality of wireless devices, and generating the updated base radio link priority model using the aggregated trained radio link priority models.

In some aspects, updating the base radio link priority model using radio link priority models received from one or more of the plurality of wireless devices may include determining whether a trigger event has occurred, and updating the base radio link priority model using radio link priority models received from one or more of the plurality of wireless devices in response to determining that the trigger event has occurred. In such aspects, determining whether a trigger event has occurred may include determining whether a threshold number of trained radio link priority models has been received from the plurality of wireless devices.

Further aspects may include a communication network element having a processor configured to perform one or more operations of any of the methods summarized above. Further aspects may include processing devices for use in a communication network element configured with processor-executable instructions to perform operations of any of the methods summarized above. Further aspects may include a non-transitory processor-readable storage medium having stored thereon processor-executable instructions configured to cause a processor of a communication network element to perform operations of any of the methods summarized above. Further aspects include a communication network element having means for performing functions of any of the methods summarized above. Further aspects include a system on chip for use in a communication network element and that includes a processor configured to perform one or more operations of any of the methods summarized above.

Various aspects include systems and methods performed by wireless devices for radio link prioritization. Various aspects may include receiving from a communication network element a base radio link priority model, using the base radio link priority model to obtain a first prioritization of radio links, attempting to establish a communication link with a communication network using the first prioritization of radio links, generating a trained radio link priority model using machine learning based on one or more attempts to establish a communication link with the communication network, sending the trained radio link priority model to the communication network element, and receiving from the communication network element an updated base radio link priority model that provides as an output a second prioritization of radio links.

In some aspects, the first prioritization of radio links and the second prioritization of radio links each may include a prioritization of radio access technologies (RATs), frequency bands, or frequencies for use by the wireless device in establishing the communication link with the communication network. In such aspects, generating a trained radio link priority model based on one or more attempts to establish the communication link with the communication network may include providing as an input to the base radio link priority model one or more of a location of each attempt to establish a communication link with the communication network, a time of each attempt, a RAT and frequency band used in each attempt, whether each attempt was successful, a reason for each attempt, and a signal strength of signals from the network associated with each attempt.

In some aspects, generating a trained radio link priority model using machine learning based on one or more attempts to establish the communication link with the communication network may include updating weighting values of the base radio link priority model based on successful and unsuccessful attempts to establish a communication link with the communication network using one or more radio links. In such aspects, sending the trained radio link priority model to the communication network element may include sending updated weighting values to the communication network element. In some aspects, sending the trained radio link priority model to the communication network element may include determining whether a difference between the base radio link priority model and the trained radio link priority model meets a threshold, and sending the trained radio link priority model to the communication network element in response to determining that the difference between the base radio link priority model and the trained radio link priority model meets the threshold.

Further aspects may include a wireless device having a processor configured to perform one or more operations of any of the methods summarized above. Further aspects may include processing devices for use in a wireless device configured with processor-executable instructions to perform operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device and that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
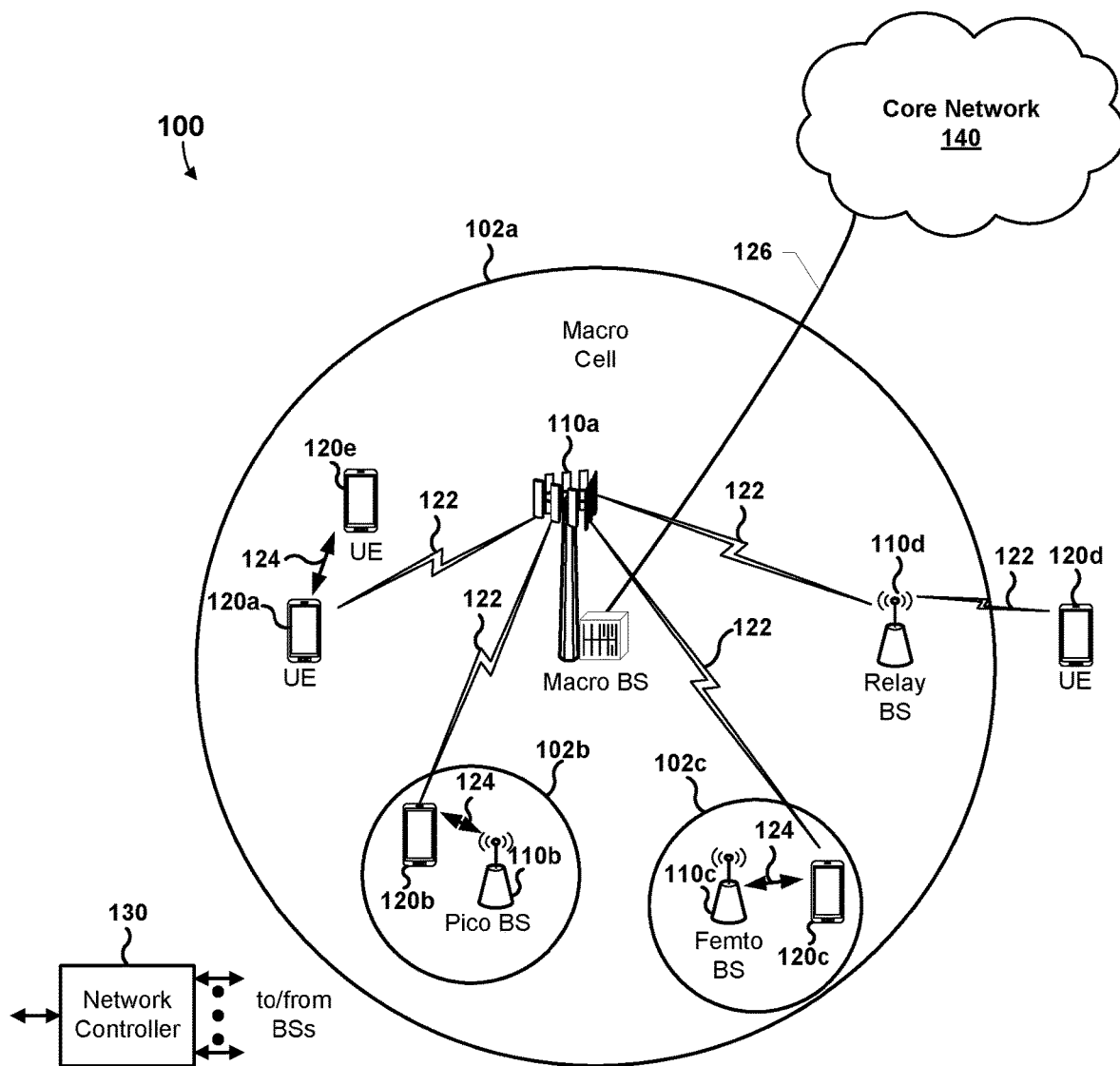
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for performing a prioritization of radio links for wireless communications between a communication network element and a wireless device. Various embodiments enable a network element of a communication system to dynamically generate and update a priority list of RAT, frequency bands, and/or frequencies on a wireless device using a radio link priority model based on the experiences of a plurality of wireless devices. The method may employ federated learning to obtain information from many wireless devices, and use the obtained information to update a radio link priority model that the network then provides to wireless devices.

The term "wireless device" is used herein to refer to any one or all of user equipment (UE), cellular telephones, smartphones, portable computing devices, wireless router devices, wireless appliances, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the tell is "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Wireless device may use an on-device priority list to select a RAT, frequency band, and/or frequency to use in attempting to perform cell acquisition or recovery via a radio link with a base station. Various conditions may cause a wireless device to have difficulty or even fail in establishing radio link or reestablishing a dropped radio link (e.g., Radio Link Failure) with a base station in a wireless communication network. For example, local radio frequency conditions, network congestion, network outages, local interference, and local shadowing may interfere with wireless devices establishing radio links with a wireless communication network. In a given area, or for a particular base station or group of base stations, such conditions will likely affect numerous wireless devices. However, wireless devices conventionally operate in isolation when establishing a wireless link with a base station, and thus all wireless devices may experience the same difficulties when establishing a radio link or recovering a failed radio link with a base station work in cases where wireless devices use the same priority list of RATs, frequency bands, and/or frequencies. Wireless communication networks conventionally provide all wireless devices with the same priority list, which results in each wireless device experiencing the same delays in establishing network communication radio links and to consume battery power unnecessarily.

Various embodiments include methods, and wireless devices and communication network elements configured to perform the methods, of radio link prioritization. In various embodiments, the communication network element may include a component or module of a base station (which may be implemented in hardware, software, or combination of hardware and software), a mobility management entity (MME) or another suitable network element or function of the communication network, a server device, or another suitable network element. In some embodiments, a server device performing the operations described herein may be an element of an Edge computing network (i.e., physically close to the wireless device, and not part of the more remote core network).

In various embodiments, a communication network element may generate and dynamically update a priority list of RATs, frequency bands, and/or frequencies used by wireless devices to establish a communication link with a communication network (e.g., via a base station). For conciseness, the term "establish a communication link" is used herein to refer collectively to all processes in which a wireless device may establish or reestablish a communication link, including initially establishing a communication link, and reestablishing a dropped or lost communication link.

Various embodiments may employ federated learning to obtain information from many wireless devices, and use the obtained information to update a radio link priority model that the communication network element then provides to wireless devices. In some embodiments, a communication network element may send to a plurality of wireless devices a base radio link priority model that provides as an output a prioritization (a first prioritization) of radio links. The prioritization of radio links may include a priority list of RATs, frequency bands, and/or frequencies. Each of the wireless devices may run (i.e., execute) an instantiation of the base radio link priority model, and each wireless device may use the prioritization of radio links output by the base radio link priority model in establishing a communication link with the communication network.

In various embodiments, each wireless device may train its instantiation of the base radio link priority model based on the experience of the wireless device attempting to establish the communication link with the communication network (e.g., connecting or reconnecting to a base station) to generate a trained radio link priority model. Each wireless device may provide as one or more inputs to the base radio link priority model information about each attempt to establish network communications with a base station in the network, including a location of each attempt, a time of each attempt, whether the attempt was successful, a reason for the attempt (e.g., initial access, radio link failure (RLF), etc.), a signal strength of the signal from the network (e.g., signal-to-noise ratio (SNR), signal-to-interference plus noise ratio (SINR), and other information).

Each wireless device may report or transmit its trained radio link priority model to the communication network element (e.g., via the base station with which each wireless device has established a communication link). In some embodiments, a wireless device may provide weighting values from the trained radio link priority model. In some embodiments, a wireless device may provide a delta or difference (or a plurality of deltas or differences) between the base radio link priority model and of the trained radio link priority model. In some embodiments, the delta or deltas may include a difference or differences between weighting values of the base radio link priority model and weighting values of the trained radio link priority model. In some embodiments, the wireless device may determine whether a difference between the base radio link priority model and the trained radio link priority model meets or satisfies a threshold. In response to determining that the difference between the base radio link priority model and the trained radio link priority model meets or satisfies the threshold, the wireless device may send the trained radio link priority model to the communication network element.

The communication network element may receive the trained radio link priority models, the weighting values, and/or the weighting value deltas and may update the base radio link priority model using the trained radio link priority models, the weighting values, and/or the weighting value deltas to generate an updated base radio link priority model. The communication network element may then send the updated base radio link priority model to the wireless devices. In some embodiments, the communication network element may aggregate a plurality of trained radio link priority models received from two or more wireless devices, and may generate the updated base radio link priority model using the aggregated trained radio link priority models. In some embodiments, aggregating the trained radio link priority models may include aggregating weighting values of trained radio link priority models. In some embodiments, aggregating the trained radio link priority models may include averaging one or more weighting values received from the wireless devices. In some embodiments, aggregating the trained radio link priority models may include adjusting one or more weighting values of the base radio link priority model using one or more weighting value deltas received from the wireless devices.

Wireless devices may receive and execute or instantiate the updated base radio link priority model, which provides as an output a second prioritization of radio links. In various embodiments, the second prioritization of radio links is more accurate than the first prioritization of radio links provided as an output by the initial base radio link priority model. In various embodiments, the second prioritization of radio links may be based on radio link acquisition and reacquisition experiences from the plurality of wireless devices. In some embodiments, the second prioritization may provide highly accurate and detailed information about the availability of radio links based on observed patterns of radio link acquisition and reacquisition and radio link conditions. For example, the second prioritization provided as an output of the updated base radio link priority model may indicate that, from 4:30 PM until 6 PM, the frequency bands using 5G RAT at a particular cell, is typically highly congested, or is unavailable. Using this information, each wireless device may select a different cell (e.g., a neighbor cell), a different RAT (e.g., 4G), a different frequency band using the 4G RAT, or another suitably different radio link for a cell acquisition or reacquisition attempt.

In various embodiments, the communication network element and the one or more wireless devices may perform their respective operations iteratively to continually improve the radio link priority model.

In some embodiments, the communication network element may be configured to generate and send out the updated radio link priority model from time to time, such as periodically, every few days, or another suitable time interval, regularly or irregularly. In some embodiments, various events may trigger the communication network element to generate and provide the updated radio link priority model. For example, the communication network element may receive a threshold number trained radio link priority models (or weighting values and/or delta values therefrom) from wireless devices. In some embodiments, receiving the threshold number of such trained radio link priority models or weighting values/deltas may indicate the presence or occurrence of a new network or radio frequency condition, such as a base station out of service or not functioning on certain frequency bands. In response to determining that the communication network element has received the threshold number of trained radio link priority models or weighting values/deltas, the communication network element may use the reported models/weights to generate an updated base radio link priority model. Additionally or alternatively, the communication network element may request information from wireless devices, such as by polling wireless devices, and use the polled information to generate an updated base radio link priority model.

Various embodiments improve the operations of the communication network by increasing the efficiency and speed of communication link acquisition and reacquisition by wireless devices in the communication network. Various embodiments further improve the operations of wireless devices by decreasing unnecessary power consumption. Various embodiments further improve the operations of the communication network by enabling communication network elements and wireless devices to improve the selection of RATs, frequency bands, and/or frequencies for communication link acquisition and reacquisition. Further, various embodiments improve the operations of the communication network by increasing the privacy of each wireless device, since each wireless device reports to the communication network element a trained radio link priority model, or weighting values or delta values therefrom. This represents an improvement over conventional methods of analyzing radio link acquisition, which require wireless devices to report, and network elements to receive and store, information that may enable the identification of specific wireless devices, including base station identities, detailed radio link information, radio link acquisition and loss patterns, and the like.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
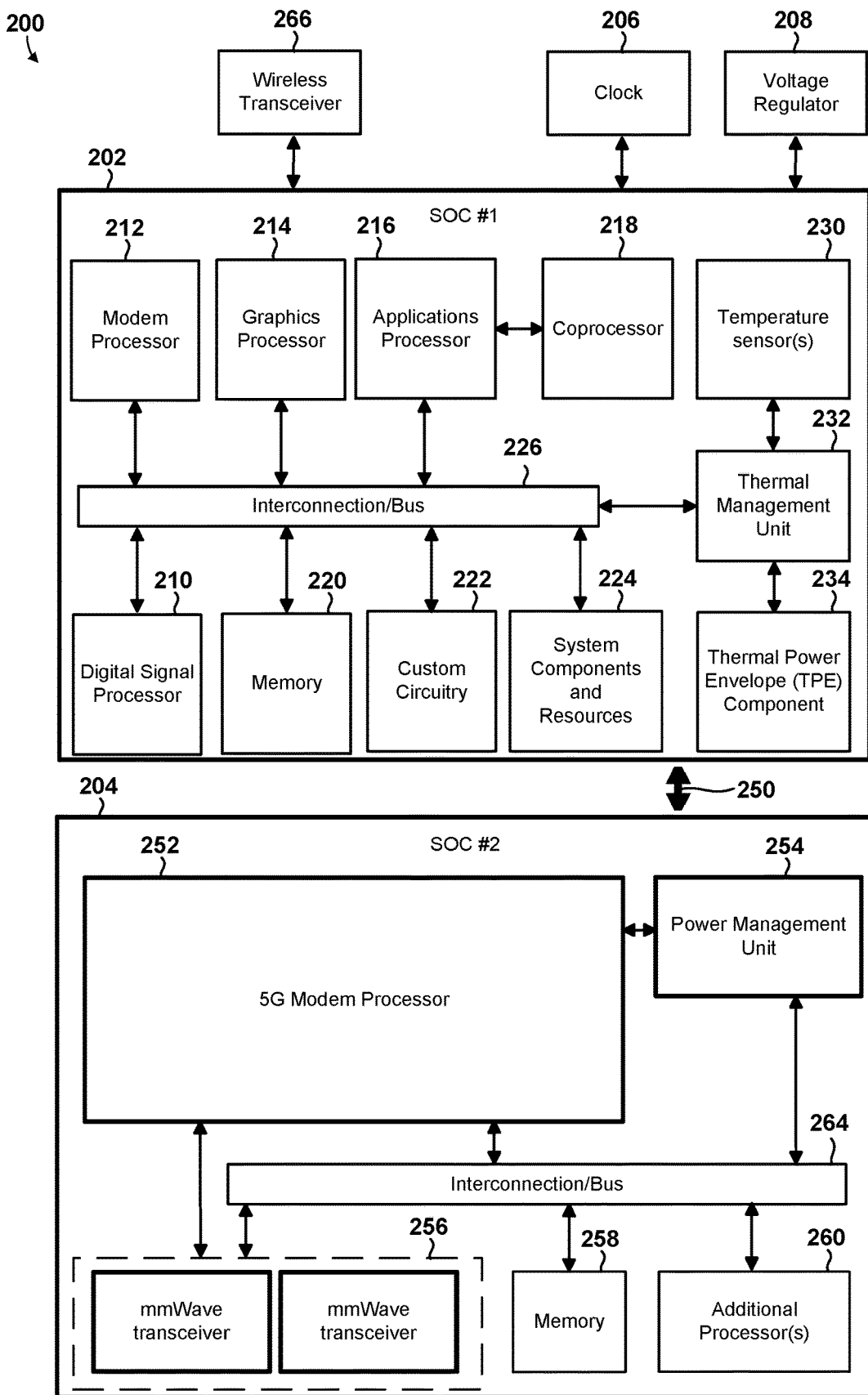
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing and wireless modem system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as a central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
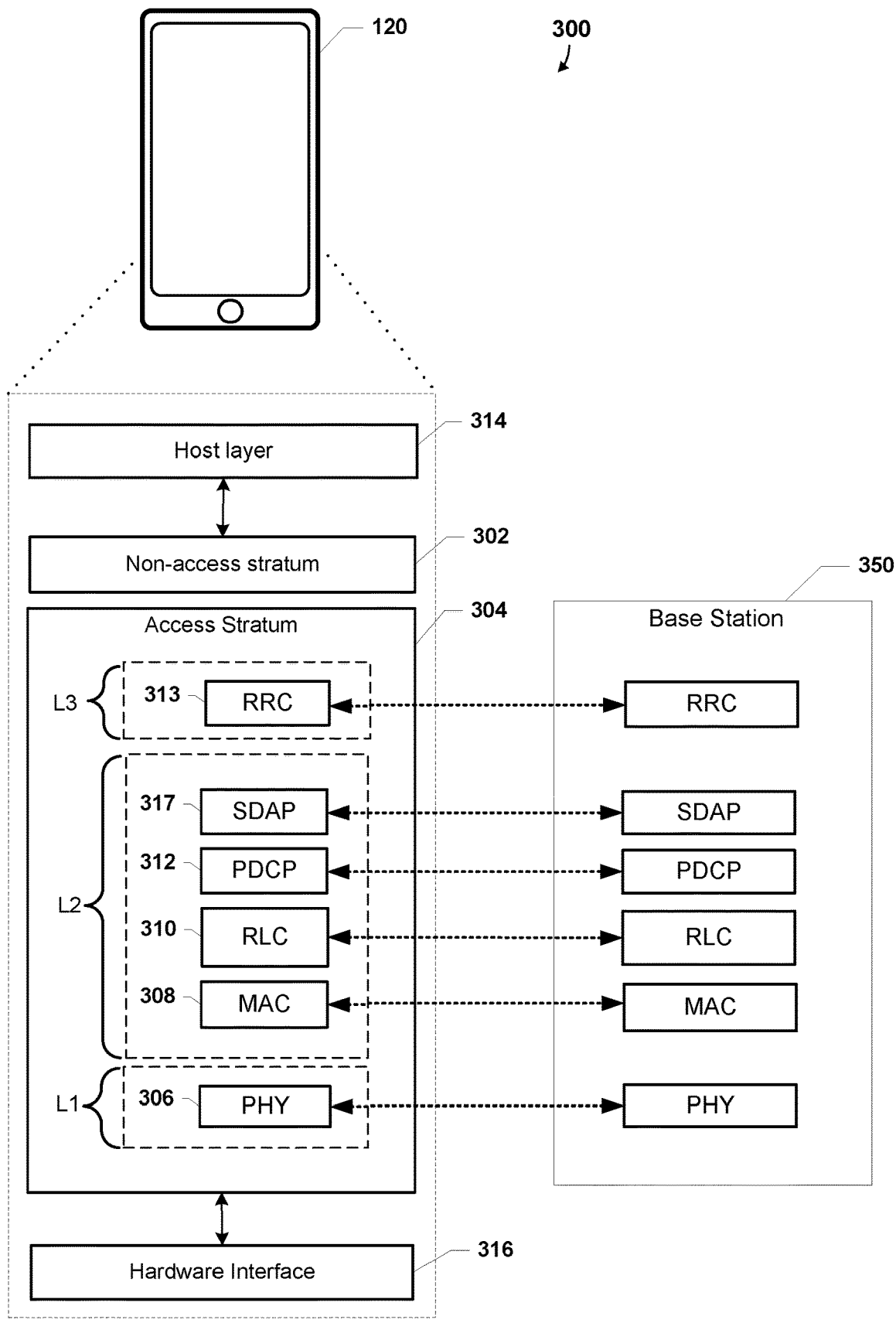
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 120 may implement the software architecture 300 to facilitate communication between a wireless device 120 (e.g., the wireless device 120a-120e, 200) and the base station 350 (e.g., the base station 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to specific 5G-NR communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 120 and the base station 350 over the physical layer 306. In some implementations, Layer 2 may include a media access control (MAC) sublayer 308, a radio link control (RLC) sublayer 310, a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 120 and the base station 350.

In some implementations, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 120, the SDAP sublayer 317 may deliver DL received QoS flows to upper layers. In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 120. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PEN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
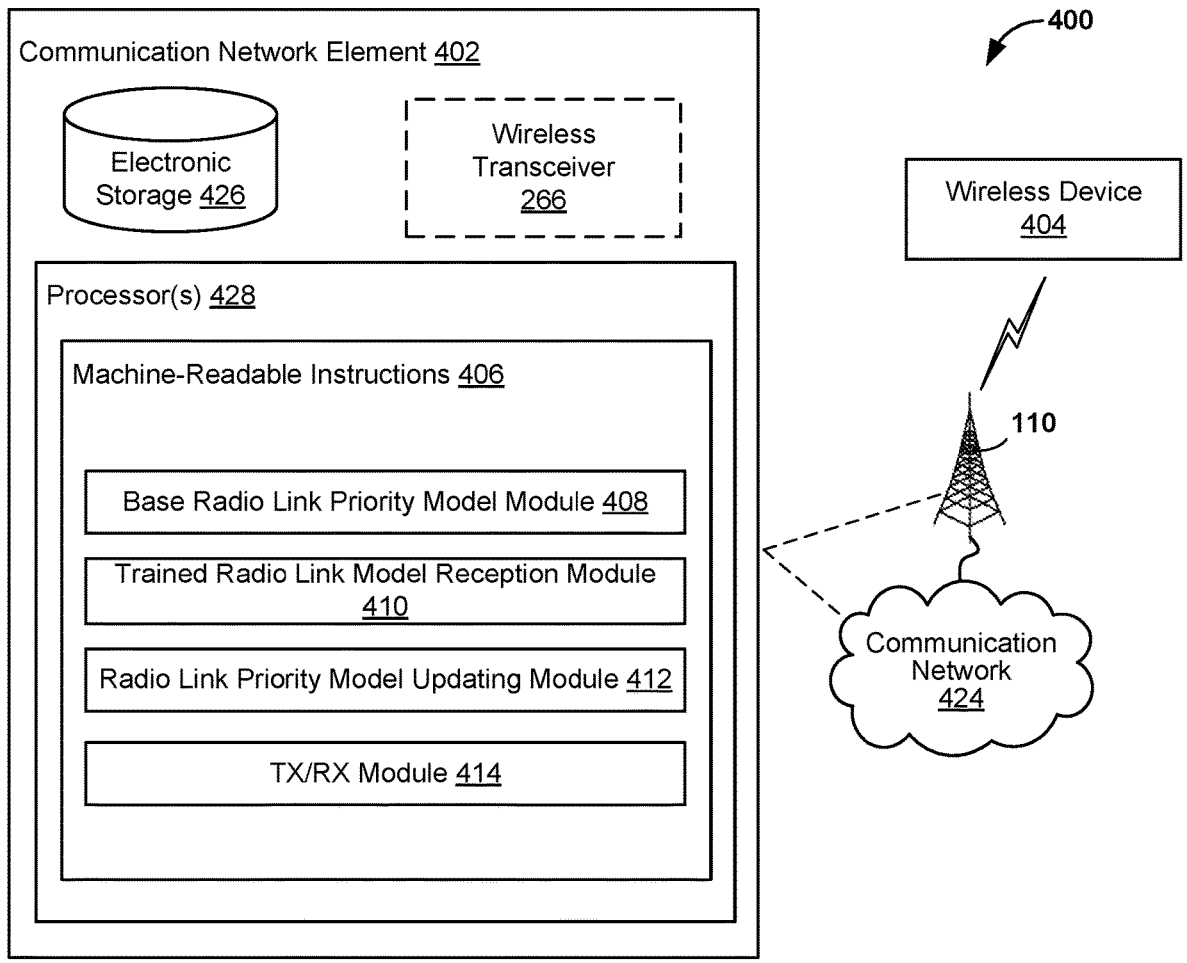
FIG. 4A is a component block diagram illustrating components and processing modules of a communication network element suitable for use with various embodiments.
Figure 4B:
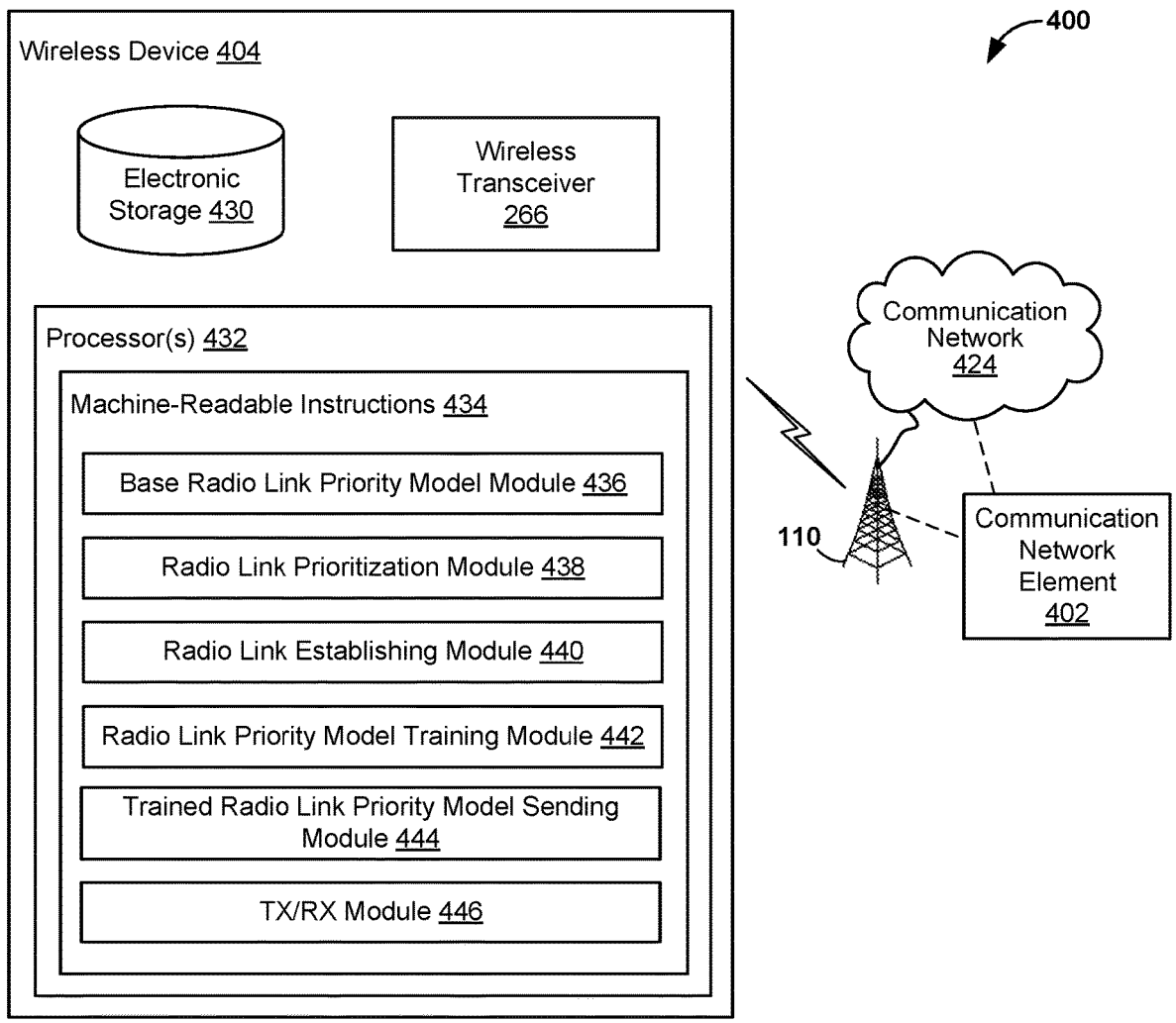
FIG. 4B is a component block diagram illustrating components and processing modules of a wireless device suitable for use with various embodiments.

FIGS. 4A and 4B are component block diagrams illustrating a system 400 configured for radio link prioritization in accordance with various embodiments. With reference to FIGS. 1-4B, system 400 may include a communication network element 402 and a wireless device 404 (e.g., 110a-110d, 120, 120a-120e, 200, 350). The communication network element 402 and the wireless device 404 may communicate over a communication network 424 via a base station 110, aspects of which are described above with respect to the communications system 100. In some embodiments, the communication network element 402 may be a network element of the communication network 424 (e.g., a module, function, server device, or another suitable element of the core network 140). In some embodiments, the communication network element 402 may be a module, function, or component of a base station (e.g. the base station 110a-110d).

The communication network element 402 and the wireless device 404 may include one or more processors 428, 432 coupled to electronic storage 426, 430 and a wireless transceiver (e.g., 266). In the communication network element 402 and the wireless device 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to communication network element 402, the processor(s) 428 may be configured by machine-readable instructions 406. Machine-readable instructions 406 may include one or more instruction modules. The instruction modules may include computer program modules. The instruction modules may include one or more of a base radio link priority model module 408, a trained radio link model reception module 410, a radio link priority model updating module 412, a transmit/receive (TX/RX) module 414, or other instruction modules.

The base radio link priority model module 408 may be configured to generate and send to a plurality of wireless devices a base radio link priority model that provides as an output a first prioritization of radio links.

The trained radio link model reception module 410 may be configured to receive from one or more of the plurality of wireless devices a trained radio link priority model generated by using machine learning to update base radio link priority model based on attempts to establish a communication link with a communication network.

The radio link priority model updating module may be configured to update the base radio link priority model using trained radio link priority models received from one or more of the plurality of wireless devices.

The transmit/receive (TX/RX) module 414 may be configured to control the transmission and reception of wireless communications with the wireless device 404, e.g., via the wireless transceiver 266. In some embodiments, the TX/RX module 414 may be configured to send and receive radio link priority models, weighting values, delta values, and/or the like.

Referring to the wireless device 404, the processor(s) 432 may be configured by machine-readable instructions 434. Machine-readable instructions 406 may include one or more instruction modules. The instruction modules may include computer program modules. The instruction modules may include one or more of a base radio link priority model module 436, a radio link prioritization module 438, a radio link establishing module 440, a radio link priority model training module 442, a trained radio link priority model sending module 444, a TX/RX module 446, or other instruction modules.

The base radio link priority model module 436 may be configured to receive from the communication network element a base radio link priority model.

The radio link prioritization module 438 may be configured to obtain a first prioritization of radio links using the base radio link priority model.

The radio link establishing module 440 may be configured to attempt to establish communication link with the communication network using the first prioritization of radio links.

The radio link priority model training module 442 may be configured to generate a trained radio link priority model using machine learning based on one or more attempts to establish a communication link with the communication network.

The trained radio link priority model sending module 444 may be configured to send the trained radio link priority model to the communication network element.

The TX/RX module 446 may be configured to enable communications with the communication network element 402, e.g., via the wireless transceiver 266.

In some embodiments, the communication network element 402 and the wireless device 404 may be operatively linked via one or more electronic communication links (e.g., wireless communication link 122, 124, 126). It will be appreciated that this is not intended to be limiting, and that the scope of this disclosure includes embodiments in which the communication network element 402 and the wireless device 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the communication network element 402 and the wireless device 404 and/or removable storage that is removably connectable to the communication network element 402 and the wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the communication network element 402 and the wireless device 404, or other information that enables the communication network element 402 and the wireless device 404 to function as described herein.

Processor(s) 428, 432 may be configured to provide information processing capabilities in the communication network element 402 and the wireless device 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-414 and modules 436-446 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 and modules 436-446 described below is for illustrative purposes, and is not intended to be limiting, as any of modules 408-414 and modules 436-446 may provide more or less functionality than is described. For example, one or more of the modules 408-414 and modules 436-446 may be eliminated, and some or all of its functionality may be provided by other modules 408-414 and modules 436-446. As another example, the processor(s) 428,432 may be configured to execute one or more additional modules that may perform some or all of the functionality attributed below to one of the modules 408-414 and modules 436-446.

Figure 5A:
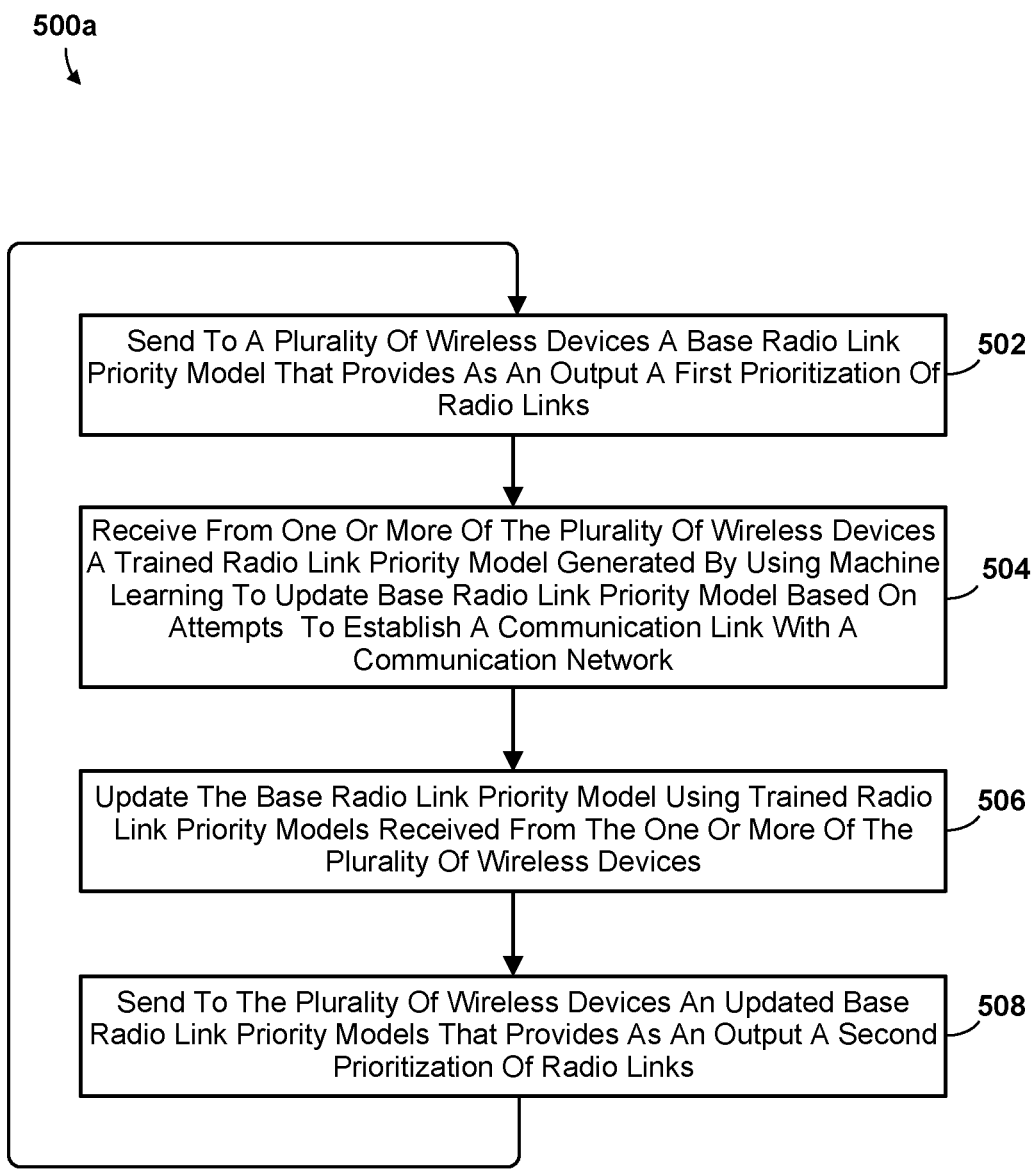
FIG. 5A is a process flow diagram illustrating a method performed by a processor of a communication network element for radio link prioritization according to various embodiments.

FIG. 5A is a process flow diagram illustrating a method 500a for radio link prioritization that may be performed by a processor of a communication network element (e.g., a base station) according to various embodiments. With reference to FIGS. 1-5B, the operations of the method 500a may be performed by a processor (such as the processor 210, 212, 214, 216, 218, 252, 260, 428) of a communication network element 402, such as a base station.

In block 502, the processor may send to a plurality of wireless devices a base radio link priority model that provides as an output a first prioritization of radio links. In some embodiments, the base radio link priority model may provide as an output a first prioritization of radio access technologies (RATs), frequency bands, and/or frequencies for use by the plurality of wireless devices in establishing a communication link with the communication network. Means for performing functions of the operations in block 502 may include the processor (e.g., 210, 212, 214, 216, 218, 252, 260, 428) and the wireless transceiver (e.g., 266).

In block 504, the processor may receive from one or more of the plurality of wireless devices a trained radio link priority model generated by using machine learning to update base radio link priority model based on attempts to establish a communication link with a communication network. In some embodiments, the processor may receive from one or more of the plurality of wireless devices weighting values from each trained radio link priority model. Means for performing functions of the operations in block 504 may include the processor (e.g., 210, 212, 214, 216, 218, 252, 260, 428) and the wireless transceiver (e.g., 266).

In block 506, the processor may update the base radio link priority model using trained radio link priority models received from one or more of the plurality of wireless devices. Means for performing functions of the operations in block 506 may include the processor (e.g., 210, 212, 214, 216, 218, 252, 260, 428).

In block 508, the processor may send to the plurality of wireless devices an updated base radio link priority models that provides as an output a second prioritization of radio links. Means for performing functions of the operations in block 508 may include the processor (e.g., 210, 212, 214, 216, 218, 252, 260, 428) and the wireless transceiver (e.g., 266).

The processor may iteratively perform the operations of blocks 502-508 from time to time.

Figure 5B:
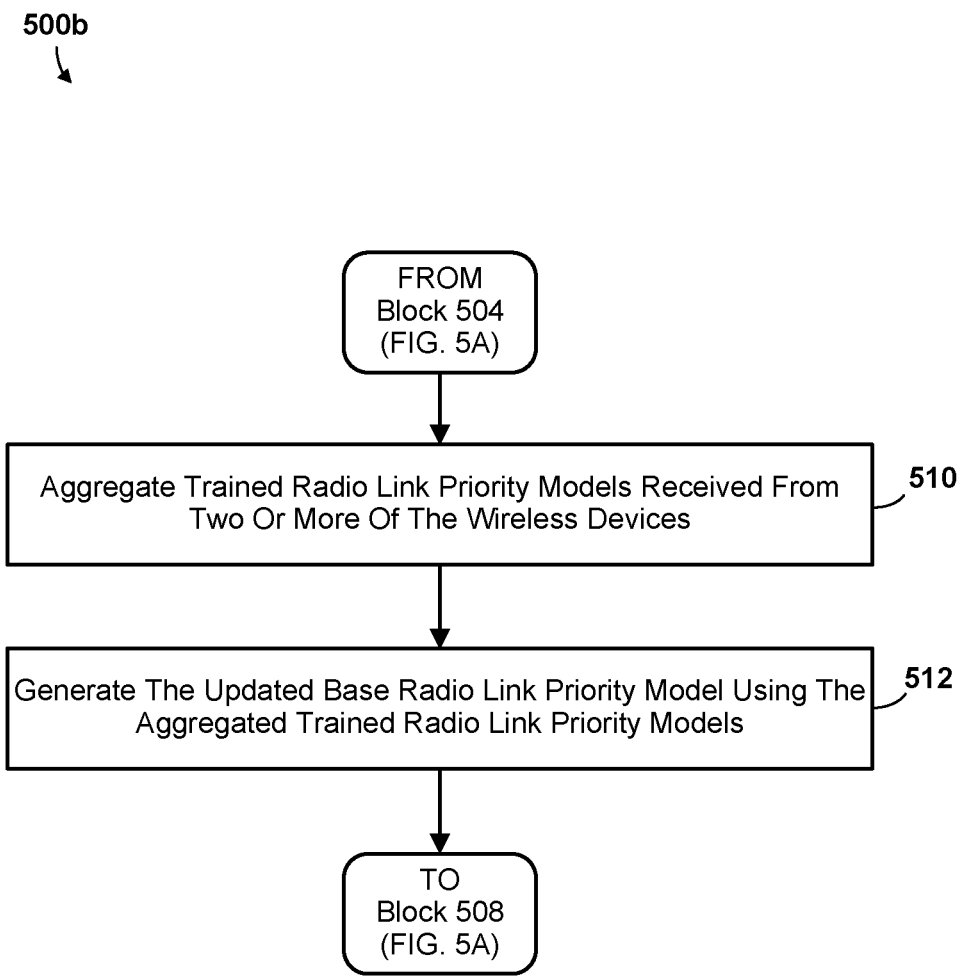
FIGS. 5B and 5C are process flow diagrams illustrating operations that may be performed by a processor of a communication network element as part of the method for radio link prioritization according to various embodiments
Figure 5C:
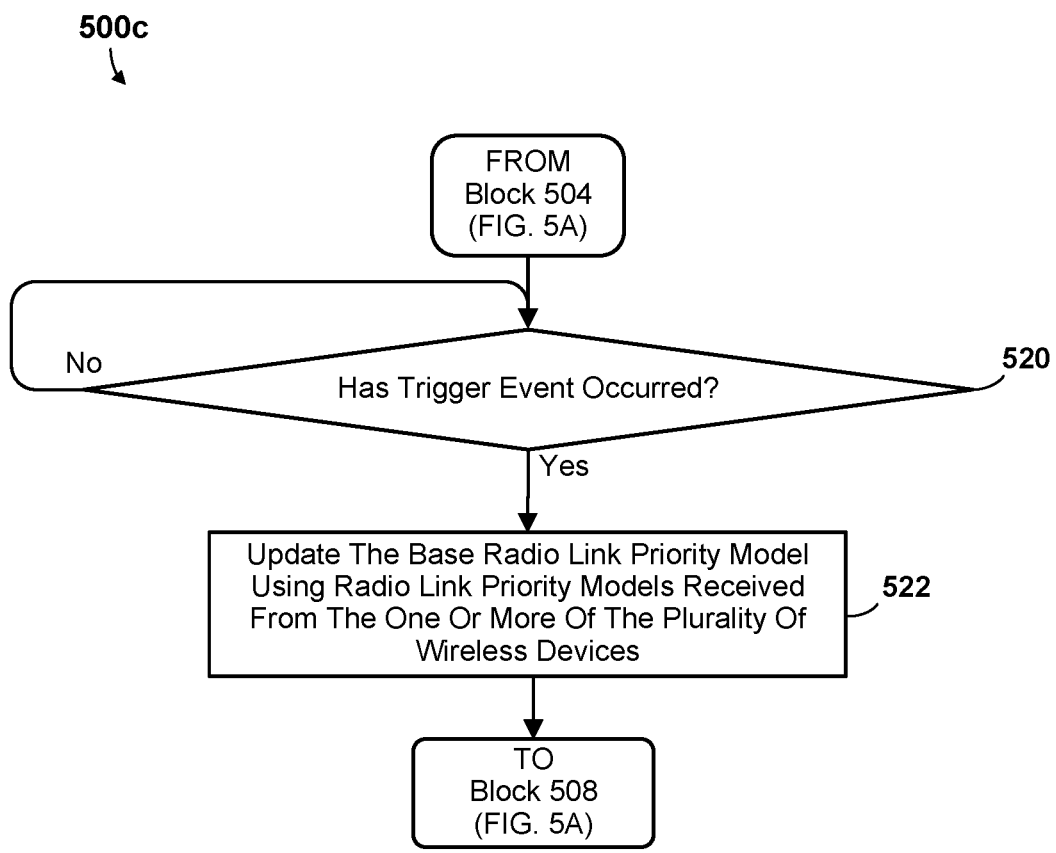

FIGS. 5B and 5C are process flow diagrams illustrating operations 500b and 500c that may be performed by a processor of a communication network element as part of the method 500a for radio link prioritization according to various embodiments. With reference to FIGS. 1-5C, the operations 500b and 500c may be performed by a processor (such as the processor 210, 212, 214, 216, 218, 252, 260, 428) of a communication network element (such as the communication network element 402).

Referring to FIG. 5B, following the performance of the operations of block 504 of the method 500a (FIG. 5A), the processor may aggregate trained radio link priority models received from two or more of the plurality of wireless devices in block 510. In some embodiments, aggregating the trained radio link priority models may include aggregating weighting values of trained radio link priority models. In some embodiments, aggregating the trained radio link priority models may include averaging one or more weighting values received from the wireless devices. In some embodiments, aggregating the trained radio link priority models may include adjusting one or more weighting values of the base radio link priority model using one or more weighting value deltas received from the wireless devices. Means for performing functions of the operations in block 510 may include the processor (e.g., 210, 212, 214, 216, 218, 252, 260, 428).

In block 512, the processor may generate the updated base radio link priority model using the aggregated trained radio link priority models. Means for performing functions of the operations in block 512 may include the processor (e.g., 210, 212, 214, 216, 218, 252, 260, 428).

The processor may then perform the operations of block 508 of the method 500a (FIG. 5A) as described.

Referring to FIG. 5C, following the performance of the operations of block 504 of the method 500a (FIG. 5A), the processor may determine whether a trigger event has occurred in determination block 520. In some embodiments, the processor may determine whether a period of time has elapsed. In some embodiments, the processor may determine whether a threshold number of trained radio link priority models has been received from the plurality of wireless devices. For example, from time to time the communication network element may receive trained radio link priority models from wireless devices. A wireless device may be configured to send its trained radio link priority model from time to time. A wireless device may be configured to send its trained radio link priority model when a radio link condition changes beyond a threshold. Additionally or alternatively, the communication network element may request information from wireless devices, such as by polling wireless devices, and use the polled information to generate an updated base radio link priority model. In some embodiments, receiving the threshold number of such trained radio link priority models or weighting values/delta values may indicate the presence or occurrence of a new network or radio frequency condition, such as a base station out of service, or that a base station is not functioning on certain frequency bands. Means for performing functions of the operations in determination block 520 may include the processor (e.g., 210, 212, 214, 216, 218, 252, 260, 428) and the wireless transceiver (e.g., 266).

In response to determining that the trigger event has not occurred (i.e., determination block 520="No"), the processor may continue to determine whether the trigger event has occurred in determination block 520.

In response to determining that the trigger event has occurred (i.e., determination block 520="Yes"), the processor may update the base radio link priority model using radio link priority models received from one or more of the plurality of wireless devices in response to determining that the trigger event has occurred in block 522. For example, in response to determining that the communication network element has received the threshold number of trained radio link priority models or weighting values/delta values, the communication network element may use the reported models/weights to generate an updated base radio link priority model. Means for performing functions of the operations in block 522 may include the processor (e.g., 210, 212, 214, 216, 218, 252, 260, 428) and the wireless transceiver (e.g., 266).

The processor may then perform the operations of block 508 of the method 500*a* (FIG. 5A) as described.

Figure 6A:
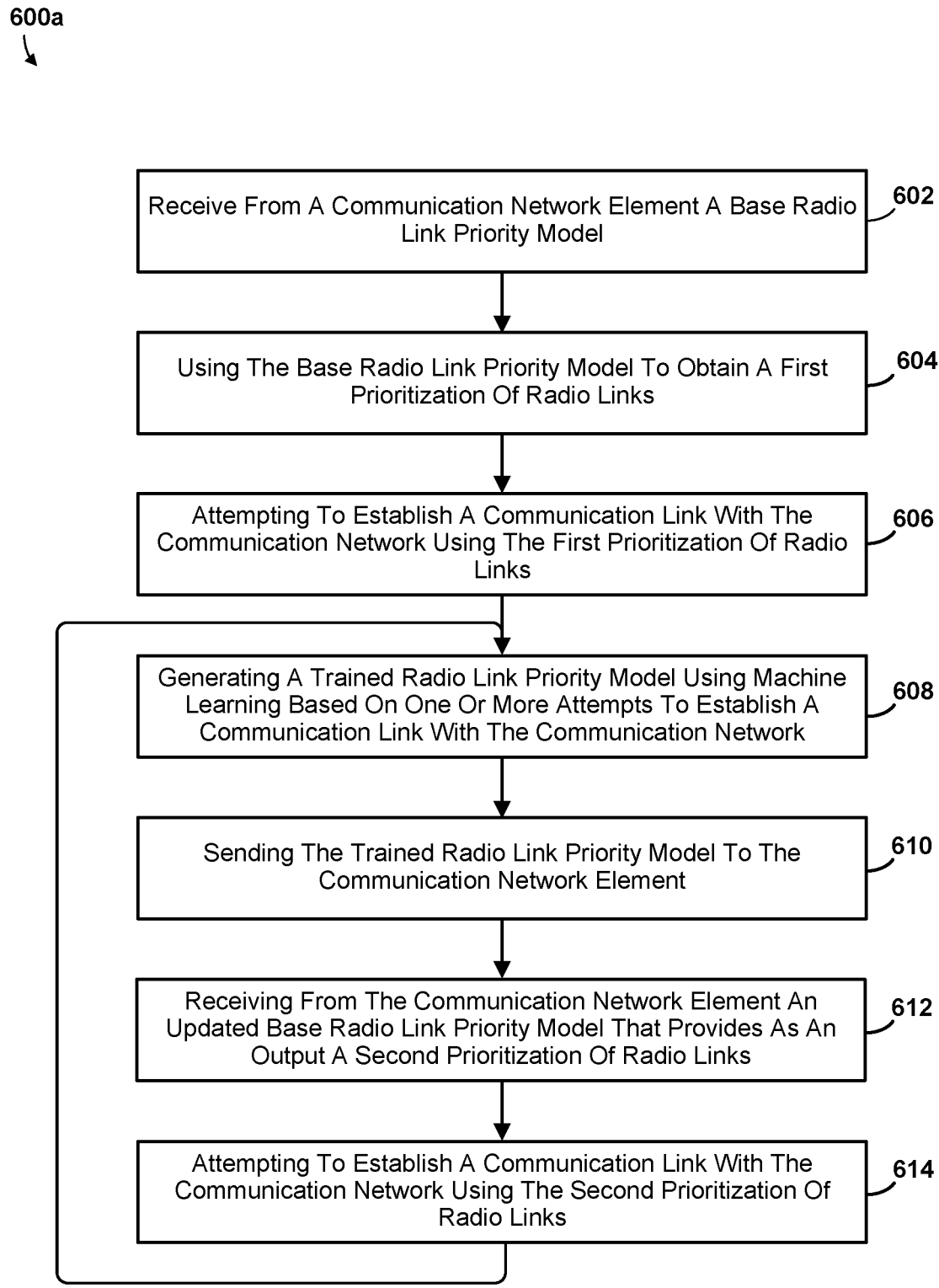
FIG. 6A is a process flow diagram illustrating a method that may be performed by a processor of a wireless device for radio link prioritization according to various embodiments.

FIG. 6A is a process flow diagram illustrating a method 600*a* that may be performed by a processor of a wireless device for radio link prioritization according to various embodiments. With reference to FIGS. 1-6A, the operations of the method 600*a* may be performed by a processor (such as the processor 210, 212, 214, 216, 218, 252, 260, 432) of a communication network element (such as the wireless device 404).

In block 602, the processor may receive from a communication network element a base radio link priority model. Means for performing functions of the operations in determination block 602 may include the processor (e.g., 210, 212, 214, 216, 218, 252, 260, 432) and the wireless transceiver (e.g., 266).

In block 604, the processor may use the base radio link priority model to obtain a first prioritization of radio links. The processor may run (i.e., execute) an instantiation of the base radio link priority model, which may provide as output the first prioritization. In some embodiments, the first prioritization may include a priority list of RATs, frequency bands, and/or frequencies. Means for performing functions of the operations in determination block 604 may include the processor (e.g., 210, 212, 214, 216, 218, 252, 260, 432).

In block 606, the processor may attempt to establish a communication link with the communication network using the first prioritization of radio links. Means for performing functions of the operations in determination block 606 may include the processor (e.g., 210, 212, 214, 216, 218, 252, 260, 432) and the wireless transceiver (e.g., 266).

In block 608, the processor may generate a trained radio link priority model using machine learning based on one or more attempts to establish a communication link with the communication network. In some embodiments, the processor may provide as inputs to the base radio link priority model information about each attempt to establish network communications with a base station in the network, including a location of each attempt, a time of each attempt, whether the attempt was successful, a reason for the attempt (e.g., initial access, radio link failure (RLF), etc.), a signal strength of the signal from the network (e.g., signal-to-noise ratio (SNR), signal-to-interference plus noise ratio (SINR), and other information). In some embodiments, the processor may train its instantiation of the base radio link priority model based on the experience of the wireless device attempting to establish the communication link with the communication network (e.g., connecting or reconnecting to a base station) to generate a trained radio link priority model. Means for performing functions of the operations in determination block 608 may include the processor (e.g., 210, 212, 214, 216, 218, 252, 260, 432).

In block 610, the processor may send the trained radio link priority model to the communication network element. In some embodiments, the processor may be configured to send its trained radio link priority model from time to time. Means for performing functions of the operations in determination block 610 may include the processor (e.g., 210, 212, 214, 216, 218, 252, 260, 432) and the wireless transceiver (e.g., 266).

In block 612, the processor may receive from the communication network element an updated base radio link priority model that provides as an output a second prioritization of radio links. In various embodiments, the second prioritization of radio links provided by the updated base radio link model may be more accurate than the first prioritization of radio links provided as output by the base radio link model. For example, the second prioritization may provide a priority list of RATs, frequency bands, and/or frequencies that more accurately reflects network conditions, radio link conditions, available RATs, available frequencies or frequency bands, available bandwidth, available throughput, available channel conditions, and the like. In various embodiments, the processor may use the second prioritization of radio links output by the updated base radio link priority model in establishing (or reestablishing) a communication link with the communication network. Means for performing functions of the operations in determination block 612 may include the processor (e.g., 210, 212, 214, 216, 218, 252, 260, 432) and the wireless transceiver (e.g., 266).

In block 614, the processor may attempt to establish a communication link with the communication network using the second prioritization of radio links. Means for performing functions of the operations in determination block 614 may include the processor (e.g., 210, 212, 214, 216, 218, 252, 260, 432) and the wireless transceiver (e.g., 266).

The processor may iteratively perform the operations of blocks 608-614 from time to time.

Figure 6B:
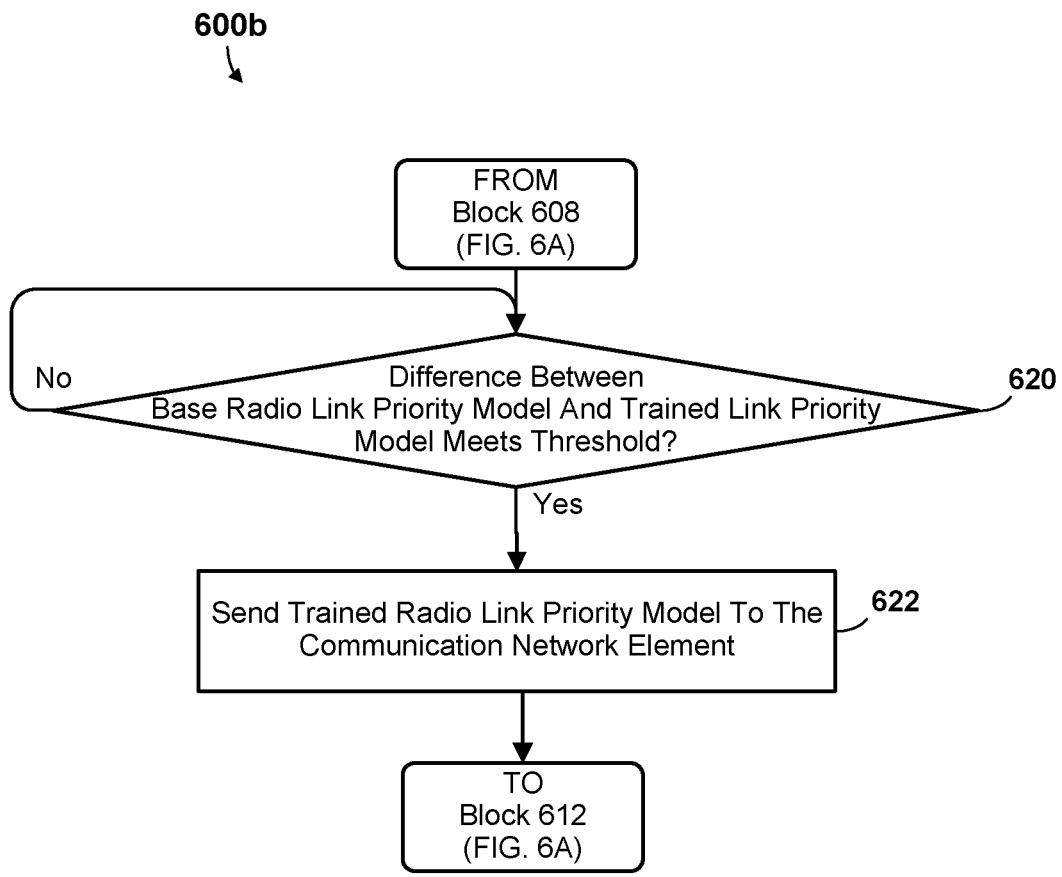
FIG. 6B is a process flow diagram illustrating operations that may be performed by a processor of a wireless device as part of the method for radio link prioritization according to various embodiments.

FIG. 6B is a process flow diagram illustrating operations 600*b* that may be performed by a processor of a wireless device as part of the method 600*a* for radio link prioritization according to various embodiments. With reference to FIGS. 1-6B, the operations 600*b* may be performed by a processor (such as the processor 210, 212, 214, 216, 218, 252, 260, 432) of a communication network element (such as the wireless device 404).

Following performance of the operations of block 608 of the method 600a (FIG. 6A), the processor may determine whether a difference between the base radio link priority model and the trained radio link priority model meets or satisfies a threshold in determination block 620. In some embodiments, to avoid unnecessarily consuming communication link resources and/or processing resources of the wireless device or the communication network element, the processor may be configured to send its trained radio link priority model in response to determining that a radio link condition has changed beyond a threshold. In some embodiments, the threshold may be determined such that the wireless device trains the radio link priority model some minimum amount before sending the trained radio link priority model. For example, the processor may determine whether the wireless device has made a threshold number of attempts to establish a communication link with the communication network. In some embodiments, the threshold may include a threshold number of successful attempts to establish a communication link with the communication network. In some embodiments, the threshold may include a threshold number of unsuccessful attempts to establish a communication link with the communication network. In some embodiments, the wireless device may determine whether the trained radio link priority model is a threshold difference or level of difference from the base radio link priority model. For example, the wireless device may determine whether one or more weighting values of the trained radio link priority model differ from one or more weighting values of the base radio link priority model by a threshold amount. In some embodiments, the difference of weighting value(s) of the trained radio link priority model and weighting value(s) of the base radio link priority model may be a difference of individual weights. In some embodiments, the difference of weighting value(s) of the trained radio link priority model and weighting value(s) of the base radio link priority model may be a difference in an aggregation of the weighting values (e.g., a sum of the weighting values, an average of the weighting values, an average difference of the weighting values, or similar differences). Means for performing functions of the operations in determination block 620 may include the processor (e.g., 210, 212, 214, 216, 218, 252, 260, 432) and the wireless transceiver (e.g., 266).

In response to determining that the difference between the base radio link priority model and the trained radio link priority model does not meet or satisfy the threshold (i.e., determination block 620="No"), the processor may again determine whether a radio link condition has changed in determination block 620.

In response to determining that the difference between the base radio link priority model and the trained radio link priority model meets or satisfies the threshold (i.e., determination block 620="Yes"), the processor may send the trained radio link priority model to the communication network element in block 622. Means for performing functions of the operations in block 622 may include the processor (e.g., 210, 212, 214, 216, 218, 252, 260, 432) and the wireless transceiver (e.g., 266).

Additionally or alternatively, the wireless device may send the trained link priority model to the communication network element under other conditions. In some embodiments, the wireless device may send the trained link priority model to the communication network element from time to time (e.g., periodically). In some embodiments, the wireless device may send the trained link priority model to the communication network element based on one or more changes to communication link parameters or conditions that improve or diminish communication link conditions beyond a threshold. In some embodiments, the wireless device may send the trained link priority model to the communication network element in response to a request from the communication network element. In some embodiments, the wireless device may send the trained link priority model to the communication network element in response to each of these conditions. Other conditions under which the wireless device may send the trained link priority model to the communication network element are possible.

The processor may then perform the operations of block 612 of the method 600a (FIG. 6A) as described.

Figure 7:
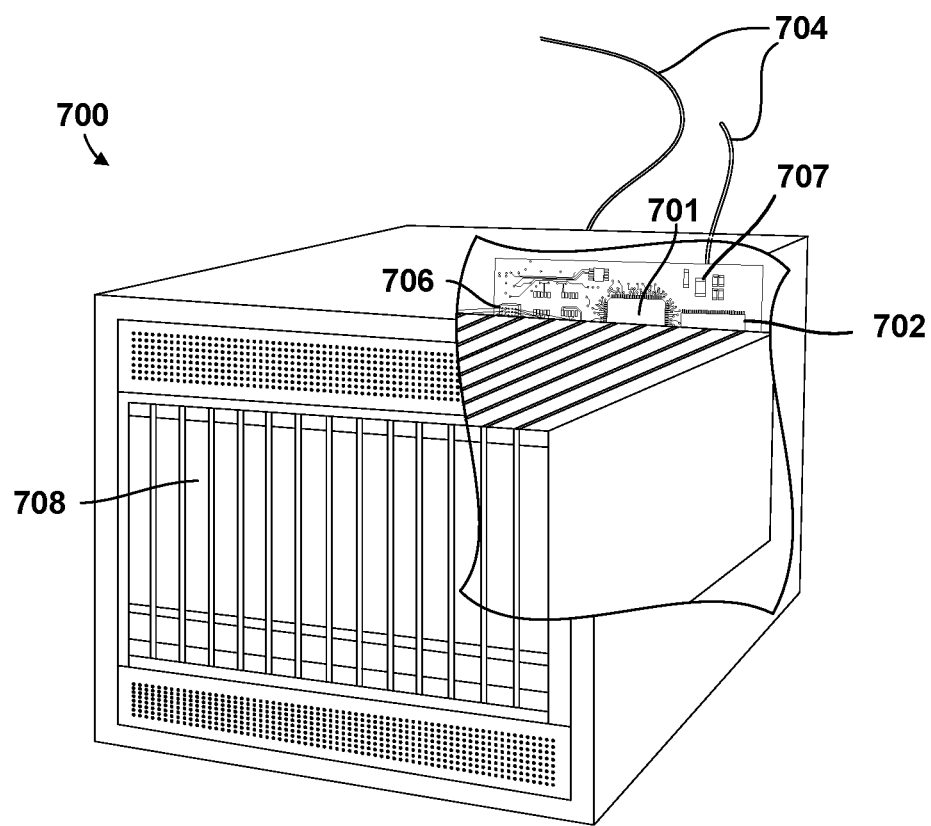
FIG. 7 is a component block diagram of a communication network element suitable for use with various embodiments.

FIG. 7 is a component block diagram of a communication network element 700 suitable for use with various embodiments. Such communication network elements (e.g., communication network element 402) may include at least the components illustrated in FIG. 7. With reference to FIGS. 1-7, the communication network element 700 may typically include a processor 701 coupled to volatile memory 702 and a large capacity nonvolatile memory, such as a disk drive 708. The communication network element 700 also may include a peripheral memory access device 706 such as a floppy disc drive, compact disc (CD) or digital video disc (DVD) drive coupled to the processor 701. The communication network element 700 also may include network access ports 704 (or interfaces) coupled to the processor 701 for establishing data connections with a network, such as the Internet or a local area network coupled to other system computers and servers. The communication network element 700 may include one or more antennas 707 for sending and receiving electromagnetic radiation that may be connected to a wireless communication link. The communication network element 700 may include additional access ports, such as USB, Firewire, Thunderbolt, and the like for coupling to peripherals, external memory, or other devices.

Figure 8:
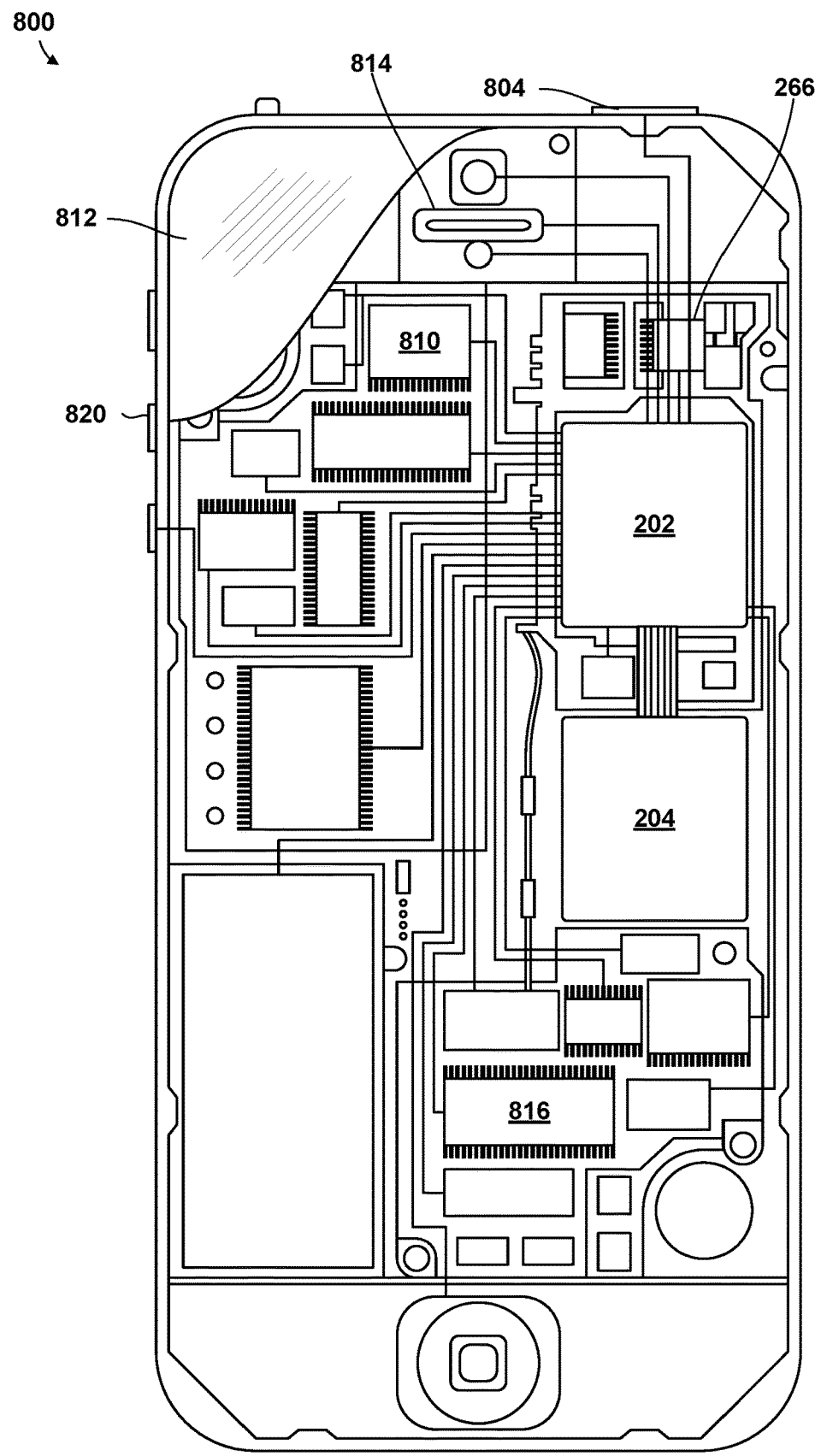
FIG. 8 is a component block diagram of a wireless device suitable for use with various embodiments.

FIG. 8 is a component block diagram of a wireless device 800 suitable for use with various embodiments. With reference to FIGS. 1-8, various embodiments may be implemented on a variety of wireless devices 800 (for example, the wireless device 120, 120a-120e, 200, 404), an example of which is illustrated in FIG. 8 in the form of a smartphone. The wireless device 800 may include a first SOC 202 (for example, a SOC-CPU) coupled to a second SOC 204 (for example, a 5G capable SOC). The first and second SOCs 202, 204 may be coupled to internal memory 816, a display 812, and to a speaker 814. Additionally, the wireless device 800 may include an antenna 804 for sending and receiving electromagnetic radiation that may be connected to a wireless data link or cellular telephone transceiver 266 coupled to one or more processors in the first and/or second SOCs 202, 204. Wireless device 800 also may include menu selection buttons or rocker switches 820 for receiving user inputs.

The wireless device 800 wireless device 800 may include a sound encoding/decoding (CODEC) circuit 810, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 810 may include a digital signal processor (DSP) circuit (not shown separately).

The processors of the communication network element 700 and the wireless device 800 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 702, 816 before they are accessed and loaded into the processor. The processors may include internal memory sufficient to store the application software instructions.

As used in this application, the tell is "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500*a*, 500*b*, 500*c*, 600*a*, and 600*b* may be substituted for or combined with one or more operations of the methods and operations 500*a*, 500*b*, 500*c*, 600*a*, and 600*b*.

Implementation examples are described in the following paragraphs. While some of the following implementation examples are described in terms of example methods, further example implementations may include: the example methods discussed in the following paragraphs implemented by a communication network element or a wireless device including a processor configured with processor-executable instructions to perform operations of the methods of the following implementation examples; the example methods discussed in the following paragraphs implemented by a communication network element or a wireless device including means for performing functions of the methods of the following implementation examples; and the example methods discussed in the following paragraphs may be implemented as a non-transitory processor-readable storage medium having stored thereon processor-executable instructions configured to cause a processor of a communication network element or a wireless device to perform the operations of the methods of the following implementation examples.

Example 1. A method performed by a communication network element of radio link prioritization, including sending to a plurality of wireless devices a base radio link priority model that provides as an output a first prioritization of radio links; receiving from one or more of the plurality of wireless devices a trained radio link priority model generated by using machine learning to update base radio link priority model based on attempts to establish a communication link with a communication network; updating the base radio link priority model using trained radio link priority models received from one or more of the plurality of wireless devices; and sending to the plurality of wireless devices an updated base radio link priority models that provides as an output a second prioritization of radio links.

Example 2. The method of example 1, in which outputs of the first prioritization of radio links and the second prioritization of radio links each includes a prioritization of radio access technologies (RATs), frequency bands, or frequencies for use by the plurality of wireless devices in establishing the communication link with the communication network.

Example 3. The method of either examples 1 or 2, in which receiving from one or more of the plurality of wireless devices a trained radio link priority model includes receiving from one or more of the plurality of wireless devices weighting values from each trained radio link priority model.

Example 4. The method of any of examples 1-3, in which updating the base radio link priority model using radio link priority models received from one or more of the plurality of wireless devices includes aggregating trained radio link priority models received from two or more of the plurality of wireless devices; and generating the updated base radio link priority model using the aggregated trained radio link priority models.

Example 5. The method of any of examples 1-4, in which updating the base radio link priority model using radio link priority models received from one or more of the plurality of wireless devices includes determining whether a trigger event has occurred; and updating the base radio link priority model using radio link priority models received from one or more of the plurality of wireless devices in response to determining that the trigger event has occurred.

Example 6. The method of example 5, in which determining whether a trigger event has occurred includes determining whether a threshold number of trained radio link priority models has been received from the plurality of wireless devices.

Example 7. A method performed by a wireless device, including receiving from a communication network element a base radio link priority model; using the base radio link priority model to obtain a first prioritization of radio links; attempting to establish a communication link with a communication network using the first prioritization of radio links; generating a trained radio link priority model using machine learning based on one or more attempts to establish a communication link with the communication network; sending the trained radio link priority model to the communication network element; and receiving from the communication network element an updated base radio link priority model that provides as an output a second prioritization of radio links.

Example 8. The method of example 7, in which the first prioritization of radio links and the second prioritization of radio links each includes a prioritization of radio access technologies (RATs), frequency bands, or frequencies for use by the wireless device in establishing the communication link with the communication network.

Example 9. The method of example 8, in which generating a trained radio link priority model based on one or more attempts to establish the communication link with the communication network includes providing as an input to the base radio link priority model one or more of a location of each attempt to establish a communication link with the communication network, a time of each attempt, a RAT and frequency band used in each attempt, whether each attempt was successful, a reason for each attempt, and a signal strength of signals from the network associated with each attempt.

Example 10. The method of any of examples 7-9, in which generating a trained radio link priority model using machine learning based on one or more attempts to establish the communication link with the communication network includes updating weighting values of the base radio link priority model based on successful and unsuccessful attempts to establish a communication link with the communication network using one or more radio links.

Example 11. The method of example 10, in which sending the trained radio link priority model to the communication network element includes sending updated weighting values to the communication network element.

Example 12. The method of any of examples 7-11, in which sending the trained radio link priority model to the communication network element includes determining whether a difference between the base radio link priority model and the trained radio link priority model meets a threshold; and sending the trained radio link priority model to the communication network element in response to determining that the difference between the base radio link priority model and the trained radio link priority model meets the threshold.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a communication network element of radio link prioritization, comprising:
   sending to a plurality of wireless devices a base radio link priority model that provides as an output a first prioritization of radio links;
   receiving from one or more of the plurality of wireless devices a trained radio link priority model generated by using machine learning to update base radio link priority model based on attempts to establish a communication link with a communication network;
   updating the base radio link priority model using trained radio link priority models received from one or more of the plurality of wireless devices; and
   sending to the plurality of wireless devices an updated base radio link priority models that provides as an output a second prioritization of radio links.

2. The method of claim 1, wherein outputs of the first prioritization of radio links and the second prioritization of radio links each comprises a prioritization of radio access technologies (RATs), frequency bands, or frequencies for use by the plurality of wireless devices in establishing the communication link with the communication network.

3. The method of claim 1, wherein receiving from one or more of the plurality of wireless devices a trained radio link priority model comprises receiving from one or more of the plurality of wireless devices weighting values from each trained radio link priority model.

4. The method of claim 1, wherein updating the base radio link priority model using radio link priority models received from one or more of the plurality of wireless devices comprises:
   aggregating trained radio link priority models received from two or more of the plurality of wireless devices; and
   generating the updated base radio link priority model using the aggregated trained radio link priority models.

5. The method of claim 1, wherein updating the base radio link priority model using radio link priority models received from one or more of the plurality of wireless devices comprises:
   determining whether a trigger event has occurred; and
   updating the base radio link priority model using radio link priority models received from one or more of the plurality of wireless devices in response to determining that the trigger event has occurred.

6. The method of claim 5, wherein determining whether a trigger event has occurred comprises determining whether a threshold number of trained radio link priority models has been received from the plurality of wireless devices.

7. A method performed by a wireless device, comprising:
   receiving from a communication network element a base radio link priority model;
   using the base radio link priority model to obtain a first prioritization of radio links;
   attempting to establish a communication link with a communication network using the first prioritization of radio links;
   generating a trained radio link priority model using machine learning based on one or more attempts to establish a communication link with the communication network;
   sending the trained radio link priority model to the communication network element; and
   receiving from the communication network element an updated base radio link priority model that provides as an output a second prioritization of radio links.

8. The method of claim 7, wherein the first prioritization of radio links and the second prioritization of radio links each comprises a prioritization of radio access technologies (RATs), frequency bands, or frequencies for use by the wireless device in establishing the communication link with the communication network.

9. The method of claim 8, wherein generating a trained radio link priority model based on one or more attempts to establish the communication link with the communication network comprises providing as an input to the base radio link priority model one or more of a location of each attempt to establish a communication link with the communication network, a time of each attempt, a RAT and frequency band used in each attempt, whether each attempt was successful, a reason for each attempt, and a signal strength of signals from the network associated with each attempt.

10. The method of claim 7, wherein generating a trained radio link priority model using machine learning based on one or more attempts to establish the communication link with the communication network comprises updating weighting values of the base radio link priority model based on successful and unsuccessful attempts to establish a communication link with the communication network using one or more radio links.

11. The method of claim 10, wherein sending the trained radio link priority model to the communication network element comprises sending updated weighting values to the communication network element.

12. The method of claim 7, wherein sending the trained radio link priority model to the communication network element comprises:
   determining whether a difference between the base radio link priority model and the trained radio link priority model meets a threshold; and
   sending the trained radio link priority model to the communication network element in response to determining that the difference between the base radio link priority model and the trained radio link priority model meets the threshold.

13. A communication network element, comprising:
   a processor configured with processor-executable instructions to:
      send to a plurality of wireless devices a base radio link priority model that provides as an output a first prioritization of radio links;
      receive from one or more of the plurality of wireless devices a trained radio link priority model generated by using machine learning to update base radio link priority model based on attempts to establish a communication link with a communication network;

update the base radio link priority model using trained radio link priority models received from one or more of the plurality of wireless devices; and send to the plurality of wireless devices an updated base radio link priority models that provides as an output a second prioritization of radio links.

14. The communication network element of claim 13, wherein the processor is further configured with processor-executable instructions such that outputs of the first prioritization of radio links and the second prioritization of radio links each comprises a prioritization of radio access technologies (RATs), frequency bands, or frequencies for use by the plurality of wireless devices in establishing the communication link with the communication network.

15. The communication network element of claim 13, wherein the processor is further configured with processor-executable instructions to receive from one or more of the plurality of wireless devices weighting values from each trained radio link priority model.

16. The communication network element of claim 13, wherein the processor is further configured with processor-executable instructions to:

aggregate trained radio link priority models received from two or more of the plurality of wireless devices; and generate the updated base radio link priority model using the aggregated trained radio link priority models.

17. The communication network element of claim 13, wherein the processor is further configured with processor-executable instructions to:

determine whether a trigger event has occurred; and update the base radio link priority model using radio link priority models received from one or more of the plurality of wireless devices in response to determining that the trigger event has occurred.

18. The communication network element of claim 17, wherein the processor is further configured with processor-executable instructions to determine whether a threshold number of trained radio link priority models has been received from the plurality of wireless devices.

19. A wireless device, comprising:

a processor configured with processor-executable instructions to:

receive from a communication network element a base radio link priority model;

use the base radio link priority model to obtain a first prioritization of radio links;

attempt to establish a communication link with a communication network using the first prioritization of radio links;

generate a trained radio link priority model using machine learning based on one or more attempts to establish a communication link with the communication network;

send the trained radio link priority model to the communication network element; and receive from the communication network element an updated base radio link priority model that provides as an output a second prioritization of radio links.

20. The wireless device of claim 19, wherein the processor is further configured with processor-executable instructions such that the first prioritization of radio links and the second prioritization of radio links each comprises a prioritization of radio access technologies (RATs), frequency bands, or frequencies for use by the wireless device in establishing the communication link with the communication network.

21. The wireless device of claim 20, wherein the processor is further configured with processor-executable instructions to provide as an input to the base radio link priority model one or more of a location of each attempt to establish a communication link with the communication network, a time of each attempt, a RAT and frequency band used in each attempt, whether each attempt was successful, a reason for each attempt, and a signal strength of signals from the network associated with each attempt.

22. The wireless device of claim 19, wherein the processor is further configured with processor-executable instructions to update weighting values of the base radio link priority model based on successful and unsuccessful attempts to establish a communication link with the communication network using one or more radio links.

23. The wireless device of claim 22, wherein the processor is further configured with processor-executable instructions to send updated weighting values to the communication network element.

24. The wireless device of claim 19, wherein the processor is further configured with processor-executable instructions to:

determine whether a difference between the base radio link priority model and the trained radio link priority model meets a threshold; and send the trained radio link priority model to the communication network element in response to determining that the difference between the base radio link priority model and the trained radio link priority model meets the threshold.

* * * * *